(12) United States Patent
Yurkovich

(10) Patent No.: US 7,249,734 B2
(45) Date of Patent: Jul. 31, 2007

(54) AERODYNAMIC VEHICLE HAVING A VARIABLE GEOMETRY, CO-PLANAR, JOINED WING

(75) Inventor: Rudolph N. Yurkovich, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 10/801,750

(22) Filed: Mar. 16, 2004

(65) Prior Publication Data
US 2007/0120007 A1    May 31, 2007

(51) Int. Cl.
*B64C 3/38*    (2006.01)
(52) U.S. Cl. .......................... 244/46; 244/49
(58) Field of Classification Search .............. 244/45 R, 244/46, 49
See application file for complete search history.

(56) References Cited

U.S. PATENT DOCUMENTS 4,053,125 A * 10/1977 Ratony ........................ 244/46
4,336,913 A    6/1982 Hall
4,365,773 A * 12/1982 Wolkovitch ................ 244/45 R
5,899,410 A *  5/1999 Garrett ...................... 244/45 R
6,986,481 B2 * 1/2006 Fanucci et al. ............ 244/3.26

FOREIGN PATENT DOCUMENTS

WO    WO 96/36533    11/1996
WO    WO-96/36533 A1 * 11/1996

* cited by examiner

*Primary Examiner*—Timothy D. Collins
(74) *Attorney, Agent, or Firm*—Harness, Dickey & Pierce, P.L.C.

(57) ABSTRACT

An aerodynamic vehicle is comprised of a pair of forward wing sections and a pair of rearward wing sections that are connected together by four pivot assemblies as a four-bar linkage. The four-bar linkage surrounds an opening provided between the forward wing sections and rearward wing sections. Movement of the wing sections varies the cumulative area of the wing sections, and adjusts the shape of the opening between the forward wing sections and rearward wing sections. Movement of the wing sections improves the aerodynamic performance of the vehicle and allows the wing sections to assume optimum configurations for operation of the vehicle at high speed and low speed.

30 Claims, 3 Drawing Sheets

AERODYNAMIC VEHICLE HAVING A VARIABLE GEOMETRY, CO-PLANAR, JOINED WING

BACKGROUND (1) Field

The present disclosure pertains to an aerodynamic vehicle having a variable geometry wing. More specifically, the present disclosure pertains to an aerodynamic vehicle that is comprised of a pair of forward wing sections and a pair of rearward wing sections that are connected together by four pivot assemblies as a four-bar linkage. The four-bar linkage surrounds an opening provided between the forward wing sections and rearward wing sections. Movement of the wing sections varies the cumulative area of the wing sections, and adjusts the shape of the opening between the forward wing sections and rearward wing sections. Movement of the wing sections improves the aerodynamic performance of the vehicle and allows the wing sections to assume optimum configurations for operation of the vehicle at high speed and low speed.

(2) Description of the Related Art

In the design of aerodynamic vehicles, for example in the design of aircraft, there are fundamental design rules that must be met in order for the vehicle to have sufficient lift at both high speed and low speed operation. The desire to optimize the lift of an aerodynamic vehicle wing has led to the design of variable geometry wings, or wings that change their shape for operation of the vehicle at different speeds to optimize the lift of the wing at the particular speed. By changing the shape of the wing, the wing sweep and wing span can be changed, the wing area can be changed, and the wing aspect ratio can be changed. The aspect ratio of the wing is an important consideration in the wing's design and is commonly calculated as the square of the wing span divided by the area of the wing (AR=wing span$^2$/area). Swept wing or variable geometry wings are typically used in military aircraft design and enable an aircraft to operate at high altitudes and for a longer flight time at lower speeds of the aircraft, for example during an observation mission, and enable the aircraft to operate at faster speeds, for example during an attack operation.

A key in the design of variable geometry aircraft wings has been the design of a lightweight mechanism that is used to change the shape of the wing. The benefits derived in designing a variable geometry wing must exceed the disadvantages associated with the additional weight of the mechanism used to change the wing shape.

SUMMARY

The present disclosure overcomes disadvantages associated with prior art aerodynamic vehicles having variable geometry wings by providing a variable geometry wing that changes between a first configuration for low speed operation and a second configuration for high speed operation, where the area of the wing in its first configuration is substantially larger than that of the wing in its second configuration. Although the variable geometry wing of the disclosure may be employed on a variety of different types of aerodynamic vehicles, the wing is described herein as being employed on an aircraft such as that disclosed in U.S. Pat. No. 5,899,410, incorporated herein by reference.

The aerodynamic vehicle of the present disclosure is basically a flying wing. The wing is comprised of a pair of forward wing sections that are connected together for relative movement, and a pair of rearward wing sections that are also connected together for relative movement. The pair of rearward wing sections are also connected to the pair of forward wing sections, forming a four-bar linkage that surrounds an opening between the forward wing sections and the rearward wing sections. Thus, the flying wing aircraft does not have a fuselage, and no portion of the aircraft is positioned in the opening between the forward wing sections and the rearward wing sections.

A forward wing of the aircraft essentially consists of the pair of forward wing sections. A leading edge of the forward wing sections defines a forward end of the aircraft. The forward wing sections are connected together by a pivot assembly that is positioned adjacent the leading edges of the forward wing sections and along a center line of the aircraft. The pivot assembly enables the forward wing sections to pivot between first relative positions where the forward wing sections project laterally outwardly from the aircraft center line to the greatest wing span extent, and second relative positions where the forward wing sections are moved to a more swept-back configuration from that of the first relative positions.

The rearward wing sections have trailing edges that together define a rearward end of the aircraft. Like the forward wing sections, the rearward wing sections are also connected together by a pivot assembly. The pivot assembly enables the rearward wing sections to move between first relative positions where the rearward wing sections have their greatest wing span, and second relative positions where the rearward wing sections have a lesser wing span.

Distal ends of the rearward wing sections are connected by pivot assemblies to the forward wing sections. The connections of the rearward wing sections to the forward wing sections forms the four-bar linkage that surrounds the opening through the wing. The pair of forward wing sections, the pair of rearward wing sections, and the opening between the wing sections are all co-planer, or positioned in a common plane.

For takeoff and landing of the flying wing which occurs at reduced speed, the four pivot assemblies are operated to increase the wing span of the wing. This causes the forward pivot assembly and the rearward pivot assembly to move toward each other along the center axis of the wing. At the same time, the pivot assemblies connecting each of the forward wing sections to a rearward wing section move laterally apart from each other. In the first relative positions of the forward wing sections the forward wing span is at its greatest. The leading edge sweep of the forward wing is between 20 and 30 degrees. The trailing edge of the front wing sections and the leading edge of the rear wing sections are at zero degrees. In these relative positions of the forward wing sections and the rearward wing sections, the opening between the forward wing sections and the rearward wing sections is closed.

As the pivot assemblies of the wing are operated causing the wing sections to move from their first relative positions toward their second relative positions, the opening is formed between the forward wing sections and the rearward wing sections. At subsonic speeds, the opening between the forward wing sections and rearward wing sections allows a flow of air to occur from the bottom surfaces of the forward wing sections to the top surfaces of the rearward wing sections. This flow of air causes the shock that is formed on the forward wing sections to move to the rearward wing sections and eliminates the region of shock-induced separation that would be present at high subsonic speeds. This provides improved aerodynamic performance of the wing.

At high speed operation, the forward pivot assembly and the rearward pivot assembly are moved to their greatest extent away from each other along the center line of the aircraft. This causes the forward wing sections and rearward wing sections to move to their second relative positions, with the opening between the forward wing sections and rearward wing sections having its largest area. The opening between the forward wing sections and the rearward wing sections decreases the overall cumulative area of the wing. This provides improved aerodynamic performance at high speed flight conditions. In addition, as the wing sections move to their second relative positions, the wing span is decreased and the wing sweep is increased. This also provides improved aerodynamic performance at high speed flight.

BRIEF DESCRIPTION OF THE DRAWINGS

Further features of the present invention are set forth in the following Detailed Description and in the drawing figures wherein:

FIG. 3 is a plan view of the vehicle of FIG. 1 as the wing sections of the vehicle move from their first relative positions toward their second relative positions; and, FIGS. 4 and 5 illustrate further movements of the wing sections of the vehicle from their first relative positions to their second relative positions.

DETAILED DESCRIPTION

In the detailed description to follow, the aerodynamic vehicle of the present disclosure is described as a flying wing. However, it should be understood that the variable geometry wing concept of the present disclosure may be employed on vehicles other than aircraft. For example, the variable geometry wing concept of the present disclosure may be employed on watercraft and on various other types of vehicles that move through the air. The description to follow of the variable geometry flying wing aircraft is intended to be illustrative only, and should not be interpreted as limiting.

Figure 1:
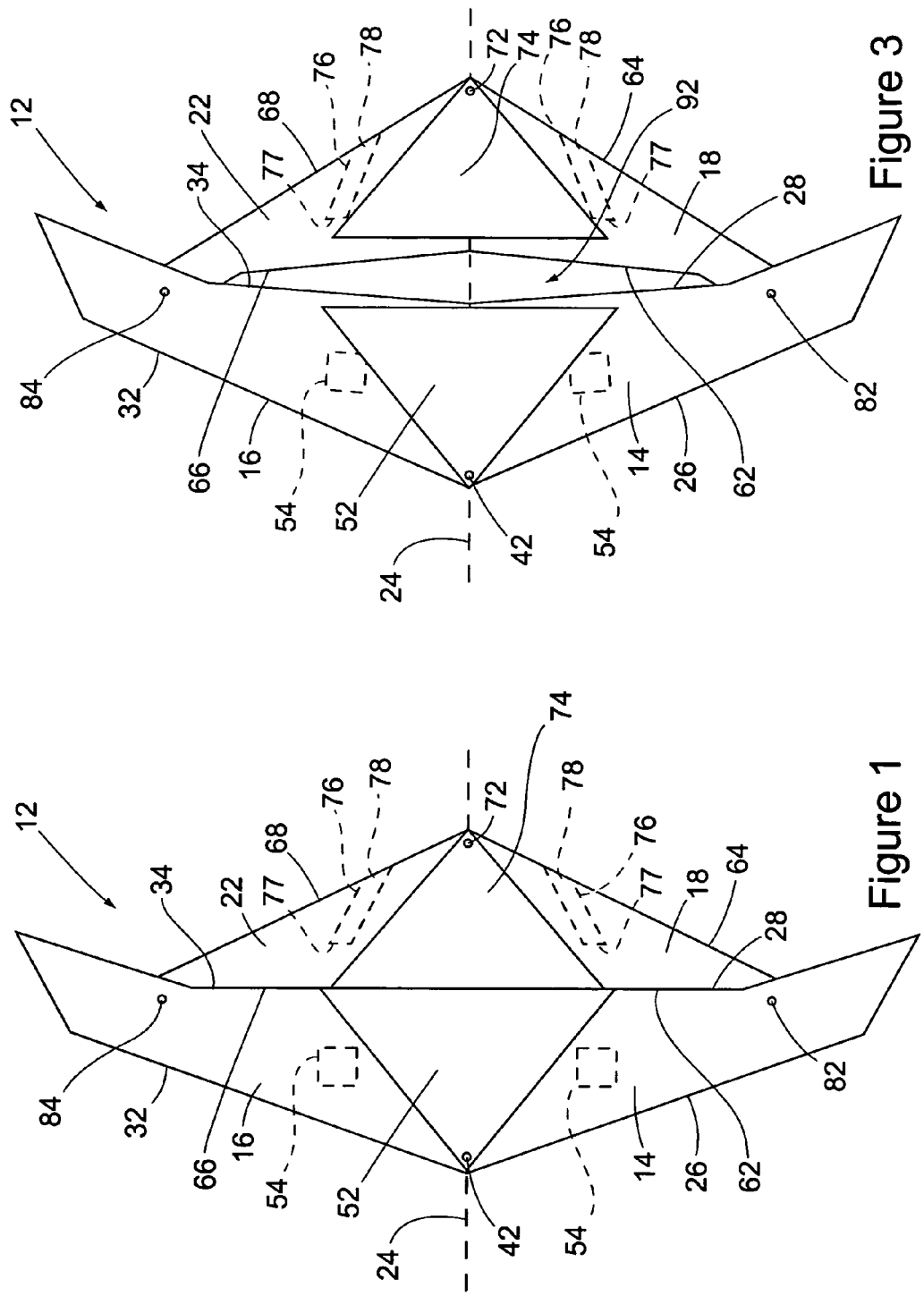
FIG. 1 is a schematic representation of a plan view of the flying wing vehicle of the present disclosure.

FIG. 1 is a schematic representation of the aerodynamic vehicle, or flying wing aircraft (12) of the present disclosure. The flying wing aircraft (12) essentially consists of a pair of forward wing sections (14, 16) that are connected together for relative movement, and a pair of rearward wing sections (18, 22) that are also connected together for relative movement. The pair of forward wing sections (14, 16) are also connected to the pair of rearward wing sections (18, 22), forming a four-bar linkage between the wing sections. The flying wing aircraft (12) has a longitudinal center axis (24). The left side forward wing section (14) and the left side rearward wing section (18) project laterally outwardly from one side of the longitudinal center axis (24), and the right side forward wing section (16) and the right side rearward wing section (22) project laterally outwardly from the opposite side of the center axis (24).

The left side forward wing section (14) has a forward most leading edge (26) and an opposite trailing edge (28). The right side forward wing section (16) also has a forward most leading edge (32) and an opposite trailing edge (34). No portions of the aircraft forward wing sections (14, 16) project beyond their respective leading edges (26, 32). Thus, the leading edges (26, 32) of the forward wing sections define a forward end of the aircraft (12). As shown on FIG. 1, the left side and right side forward wing sections (14, 16) are moved to their first relative positions. In these positions of the forward wing sections (14, 16), the leading edges (26, 32) of the wing sections are each oriented at a 20 degree angle relative to a line extending laterally across the forward most tip of the aircraft that is perpendicular to the aircraft center axis (24). With the forward wing sections (14, 16) positioned in their first relative positions shown in FIG. 1, the wing span laterally across the forward wing sections (14, 16) is at its greatest, and the cumulative area of the forward wing sections (14, 16) is its greatest.

The forward wing sections (14, 16) are connected together for relative movement by a forward pivot assembly (42) represented schematically in the drawing figures. There are different types of mechanisms that enable pivoting movement of aircraft wings are known in the art. As seen in FIG. 1, the forward pivot assembly (42) is moved forward along the aircraft center axis (24) relative to the left side and right side forward wing sections (14, 16) so that it is positioned close to the leading edges (26, 32) of the two wing sections. The forward pivot assembly (42) connects to the front spar of each of the left side and right side forward wing sections (14, 16) through a root fitting. This fitting moves the pivot point of the forward pivot assembly (42) to the leading edge of the forward wing, as shown in FIG. 1.

The center section of the forward wing is covered by a forward glove structure (52) that contains the internal structure of the aircraft that supports the forward pivot assembly (42) and the actuation mechanisms of the pivot assembly. The forward glove structure (52) could also contain a crew compartment of the aircraft, if so required.

Because the aircraft (12) is designed as a flying wing and does not have a fuselage, mass items that would normally be carried in the fuselage are distributed over the forward wing sections (14, 16) and rearward wing sections (18, 22). This maintains the balance of the aircraft and counters the aerodynamic lift force in a distributed way, such that the loads carried at the pivot assemblies are minimized. In FIG. 1, the dashed rectangles (54) are representative of areas in the forward wing sections (14, 16) in which mass items, for example ordnance in a military aircraft, would be carried.

The left side rearward wing section (18) has a leading edge (62) and an opposite trailing edge (64). The right side rearward wing section (22) also has a leading edge (66) and an opposite trailing edge (68). Together, the leading edges (62, 66) of the left side rearward wing section (18) and right side rearward wing section (22) define a forward edge of the rearward wing. The trailing edges (64, 68) of the left side rearward wing section (18) and right side rearward wing section (22) define a trailing edge of the aircraft (12) and the rearward most end of the aircraft. As seen in FIG. 1, with the forward wing sections (14, 16) in their first relative positions and with the rearward wing sections (18, 22) in their first relative positions, the trailing edges (28, 34) of the forward wing sections are co-linear with the leading edges (62, 66) of the rearward wing sections.

The rearward wing sections (18, 22) are connected together for relative movement between their first and second relative positions by a rearward pivot assembly (72). The rearward pivot assembly (72) is substantially the same as the forward pivot assembly (42). The rearward pivot assembly (72) is connected to the aft spars of the rearward wing sections (18, 22) through a root fitting that moves the rearward pivot assembly (72) to the trailing edges (64, 68) of the rearward wing sections. The rearward pivot assembly (72) is positioned along the longitudinal center axis (24) of the aircraft and is contained in a rearward glove structure (74). The rearward glove structure (74) also contains the actuation mechanisms of the rearward pivot assembly (72). The rearward glove structure (74) could also contain a crew compartment.

Figure 5:
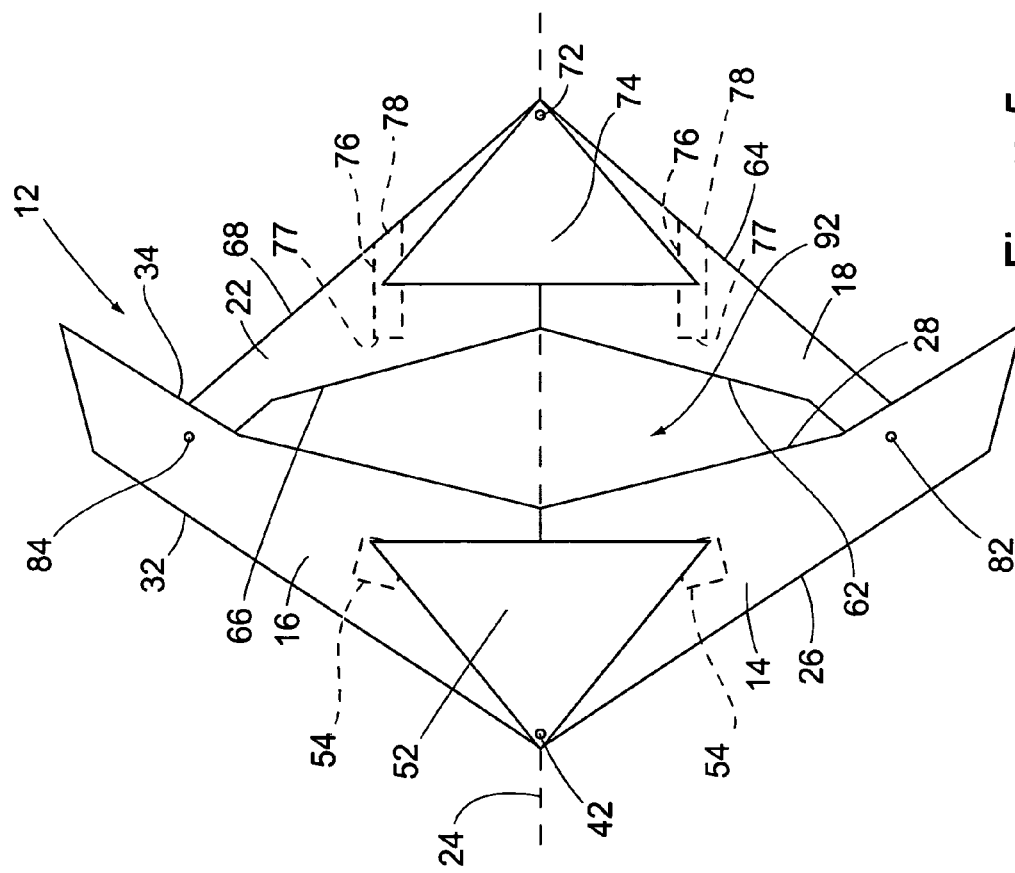

The engines (76) of the aircraft are mounted to the rearward wing sections (18, 22) as represented by the dashed lines in FIG. 1. The engines (76) are mounted to the rearward wing sections (18, 22) in a manner such that when the rearward wing sections are moved between their first and second relative positions to their air most position as shown in FIG. 5, the longitudinal axes of the engines (76) are aligned with the longitudinal center axis (24) of the aircraft. As the rearward wing sections (18, 22) move, the engines (76) are canted relative to the aircraft center axis (24) by an angle that is equal to the change in the angular relationship between each rearward wing (18, 22) and the center line of the aircraft (24). A variable geometry, active flow control inlet (77) and a thrust vectoring nozzle (78) are incorporated into each of the engines (76) to turn the flow through the engines such that it will remain parallel to the aircraft longitudinal center axis (24) at all times. In alternative embodiments, the engines (76) could be mounted on external pylons that allow the engines to be rotated to remain parallel to the aircraft center axis (24) as the wings move. In a second alternative embodiment, the engines (76) could be mounted to the outboard pivots (82, 84) and be rotated to remain parallel to the aircraft center axis (24) as the wings move.

A left side pivot assembly (82) connects the left side rearward wing section (18) to the left side forward wing section (14). A right side pivot assembly (84) connects the right side rearward wing section (22) to the right side forward wing section (16). The left side pivot assembly (82) and right side pivot assembly (84) are substantially the same as the forward pivot assembly (42) and the rearward pivot assembly (72). As shown in the drawing figures, the left side pivot assembly (82) and right side pivot assembly (84) connect the respective left side rearward wing section (18) and right side rearward wing section (22) to intermediate portions of the left side forward wing section (14) and right side forward wing section (16). In alternate embodiments, the left side and right side pivot assemblies (82, 84) could be moved closer to the distal ends of the left side forward wing section (14) and the right side forward wing section (16). The left side and right side pivot assemblies (82, 84) are attached to the respective left side and right side forward wing sections (14, 16) at a rear spar of the wing sections through a fixture that moves the pivot assemblies to the trailing edges of the wing sections. A similar fixture attaches the left side and right side pivot assemblies (82, 84) to forward spars of the left side and right side rearward wing sections (18, 22) so that the pivot assemblies are located at the leading edges of the these wing sections.

Figure 2:
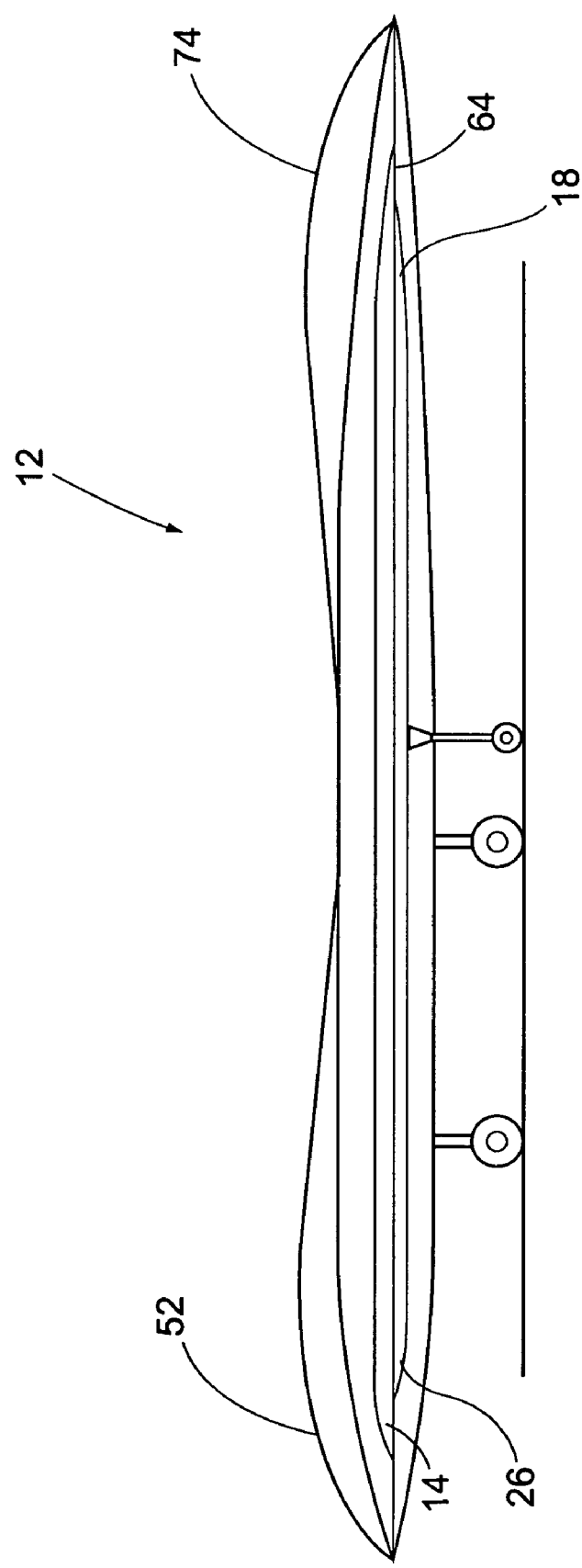
FIG. 2 is a side elevation view of the vehicle of FIG. 1.

The connections of the forward wing sections (14, 16) to the rearward wing sections (18, 22) provided by the four pivot assemblies (42, 72, 82, 84) forms the aircraft as a four-bar linkage. The pair of forward wing sections (14, 16), the pair of rearward wing sections (18, 22), and the opening that forms between the forward wing sections and rearward wing sections as they are moved toward their second relative positions are all co-planar, or positioned in a common plane. The co-planar relationship of the wing sections can best be seen in FIG. 2.

The four pivot assemblies (42, 72, 82, 84) connect the four wing sections (14, 16, 18, 22) in a four-bar linkage configuration that enables the flying wing aircraft (12) to change its shape and optimize its performance at different speeds. For take offs and landings of the aircraft, which occur at slower speeds, it is desirable for the aircraft to have its largest wing surface area. To achieve this configuration, the four pivot assemblies (42, 72, 82, 84) are actuated causing the aircraft to move to its first configuration shown in FIG. 1. The pivot assemblies are actuated to cause the forward pivot assembly (42) and rearward pivot assembly (72) to move toward each other along the aircraft center axis (24) to their closest relative positions shown in FIG. 1. The left side pivot assembly (82) and right side pivot assembly (84) are moved laterally away from each other to their greatest extent. In FIG. 1, the left side and right side forward wing sections (14, 16) and the left side and right side rearward wing sections (18, 22) are in their first relative positions. The wingspan of the aircraft is at its greatest. The cumulative area of the wing aircraft is also at its greatest. This configuration of the aircraft also gives it its highest aspect ratio. The leading edge sweep of the aircraft is defined by the leading edges (26, 32) of the left side and right side forward wing sections (14, 16) that are each oriented at a 20 degree angle relative to a line extending laterally across the forward most tip of the aircraft that is perpendicular to the aircraft center axis (24). The trailing edges (28, 34) of the left side and right side forward wing sections (14, 16) between the left side and right side pivot assemblies (82, 84) are oriented at zero degrees relative to a lateral line that is perpendicular to the aircraft center axis (24). The leading edges (62, 66) of the left side and right side rearward wing sections (18, 22) are also oriented at zero degrees relative to a lateral line that is perpendicular to the longitudinal center axis (24) of the aircraft. As seen in FIG. 1, in the first relative positions of the forward wing sections (14, 16) and the rearward wing sections (18, 22), the opening between the wing sections is closed.

Figure 4:
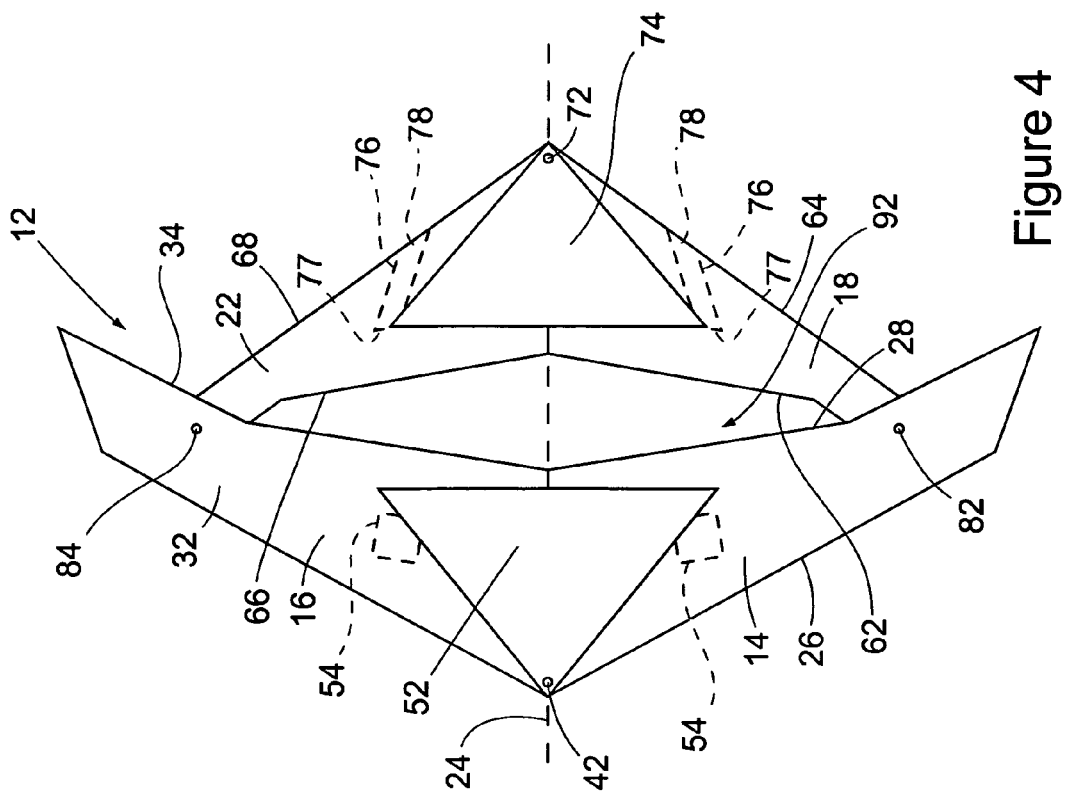

Following take off, the forward wing sections (14, 16) and rearward wing sections (18, 22) are moved toward their second relative positions as shown in FIGS. 3-5. The four pivot assemblies (42, 72, 82, 84) are actuated, causing the forward pivot assembly (42) and rearward pivot assembly (72) to move away from each other along the longitudinal center axis (24) of the aircraft, and causing the left side pivot assembly (82) and right side pivot assembly (84) to move toward each other. This causes the left and right side forward wing sections (14, 16) to sweep aft, and causes the left side and right side rearward wing sections (18, 22) to sweep forwardly. This forms the opening (92) between the forward wing sections (14, 16) and the rearward wing sections (18, 22). No portion of the aircraft is positioned in the opening (92). The opening (92) is maintained between the forward wing sections (14, 16) and the rearward wing sections (18, 22) such that at high subsonic speeds, a flow of air from the underside of the forward wing sections (14, 16) passes through the opening (92) to the top surfaces of the rearward wing sections (18, 22). This flow of air causes the shock wave that is formed on the forward wing sections (14, 16) to move to the rearward wing sections (18, 22) and eliminates the region of shocked induced separation that would be present at high subsonic speeds. This provides the aircraft (12) with improved aerodynamic performance at this condition.

At high speed operation of the aircraft (12), the forward pivot assembly (42) and rearward pivot assembly (72) are moved away from each other to their furthest extent as shown in FIG. 5. This increases the size of the opening (92) to its largest extent. The opening (92) between the forward wing sections (14, 16) and rearward wing sections (18, 22) being enlarged to its furthest extent serves to decrease the cumulative area of the wing sections (14, 16, 18, 22) to its smallest extent, which provides improved aerodynamic performance at high speed flight conditions. In the preferred embodiment, the cumulative surface area of the forward wing sections (14, 16) and rearward wing sections (18, 22)

is reduced by 30 percent as the wing sections are moved from their first relative positions to their second relative positions. In addition, as the forward wing sections (14, 16) are swept aft, the aspect ratio of the wing sections is reduced and the wing span is decreased. This also provides improved aerodynamic performance at high speed flight. In the preferred embodiment, the aspect ratio is reduced from 5 to 2.2. The sweep angle of the forward wing section leading edges changes from 20° degrees to 55° degrees as the wing sections are moved from their first relative positions to their second relative positions. The wing span is 1.8 times larger in the first relative positions of the wing sections then in the second relative positions of the wing sections.

As explained above, the aerodynamic vehicle of the disclosure, in the illustrative embodiment a flying wing aircraft, consists of pairs of forward and rearward co-planar joined wing sections which provide significant aerodynamic and structural advantages. The relative positions of the co-planar forward and rearward joined wing sections can be positionally varied to provide variable wing sweep, variable wing area, and variable wing aspect ratio such that the flying wing aircraft can maintain optimal aerodynamic performance as it changes its configurations as its mission changes between low speed cruise and high speed operations.

The invention claimed is:

1. An aerodynamic vehicle comprising:
    a left side forward wing section;
    a right side forward wing section connected to the left side forward wing section for movement of the left side and right side forward wing sections between first and second relative positions, the left side and right side forward wing sections forming a leading edge of the aerodynamic vehicle;
    a left side rearward wing section;
    a right side rearward wing section connected to the left side rearward wing section for movement of the left side and right side rearward wing sections between first and second relative positions; and
    the left side forward wing section being connected, to the left side rearward wing section and the right side forward wing section being connected to the right side rearward wing section to enable the right side forward wing section and the left side forward wing section to each move a selected distance from the right side rearward wing section and the left side rearward wing section, respectively, to define an opening between the left side and right side forward wing sections and the left side and right side rearward wing sections with no other portion of the aerodynamic body being positioned in the opening.

2. The vehicle of claim 1, further comprising:
    the left side and right side forward wing sections and the left side and right side rearward wing sections being positioned in a common plane.

3. The vehicle of claim 2, further comprising:
    a forward pivot assembly connecting the left side and right side forward wing sections for relative pivoting movement.

4. The vehicle of claim 3, further comprising:
    a rearward pivot assembly connecting the left side and right side rearward wing sections for relative pivoting movement.

5. The vehicle of claim 1, further comprising:
    the vehicle having a center axis;
    the left side forward wing section and left side rearward wing section projecting laterally outward from a first side of the center axis; and
    the right side forward wing section and the right side rearward wing section projecting laterally outward from a second side of the center axis.

6. The vehicle of claim 1, further comprising:
    a left side pivot assembly connecting the left side forward wing section and the left side rearward wing section; and
    a right side pivot assembly connecting the right side forward wing section and the right side rearward wing section.

7. The vehicle of claim 6, further comprising:
    the vehicle having a transverse axis that intersects the left side pivot assembly and the right side pivot assembly, and the left side and right side pivot assemblies moving along the transverse axis when the left side and right side forward wing sections are moved between the first and second relative positions.

8. The vehicle of claim 1, further comprising:
    the left side and right side forward wing sections and the left side and right side rearward wing sections having a cumulative first area when the left side and right side forward wing sections are in the first relative positions, and having a second cumulative area when the left side and right side forward wing sections are in the second relative positions; and the first cumulative area being larger than the second cumulative area.

9. The vehicle of claim 8, further comprising:
    the first cumulative area being at least 30% larger than the second cumulative area.

10. The vehicle of claim 1, further comprising:
    the left side and right side forward wing sections and the left side and right side rearward wing sections having a first aspect ratio when the left side and right side forward wing sections are in the first relative positions, and having a second aspect ratio when the left side and right side forward wing sections are in the second relative positions, and the first aspect ratio being larger than the second aspect ratio.

11. The vehicle of claim 1, further comprising:
    the left side and right side forward wing sections having a first wing span when the left side and right side forward wing sections are in the first relative positions, and having a second wing span when the left side and right side forward wing sections are in the second relative positions, and the first wing span being larger than the second wing span.

12. The vehicle of claim 8, further comprising:
    the left side and right side forward wing sections having leading edges that are positioned at a first sweep angle in the first relative positions of the left side and right side forward wing sections, and being positioned at a second sweep angle in the second relative positions of the left side and right side forward wing sections, and the first sweep angle being smaller than the second sweep angle.

13. An aerodynamic vehicle consisting essentially of:
    a left side forward wing section that moves between a first and second relative position;
    a right side forward wing section connected to the left side forward wing section for movement between the first and second relative positions with the left side forward wing section, the left side and right side forward wing sections forming a leading edge of the aerodynamic vehicle;
    a left side rearward wing section that moves between a first and a second relative position;
    a right side rearward wing section connected to the left side rearward wing section for movement between the first and second relative positions with the left side rearward wing section;

the left side forward and rearward wing sections being connected together for relative movement;

the right side forward and rearward wing sections being connected together for relative movement; and the relative movement of the right side forward and rearward wing sections and the relative movement of the left side forward and rearward wing sections defines an opening between the right and left forward wing sections and the right and left rearward wing sections.

14. The vehicle of claim 13, comprising:

the left side and right side forward wing sections and the left side and right side rearward wing sections being positioned in a common plane.

15. The vehicle of claim 13, comprising:

the right side forward wing section being connected to the left side forward wing section by a forward pivot assembly.

16. The vehicle of claim 15, comprising:

the right side rearward wing section being connected to the left side rearward wing section by a rearward pivot assembly.

17. The vehicle of claim 13, comprising:

the left side forward and rearward wing sections being connected together by a left side pivot assembly; and the right side forward and rearward wing sections being connected together by a right side pivot assembly.

18. The vehicle of claim 13, comprising:

the left side and right side forward wing sections and the left side and right side rearward wing sections having a first cumulative area when the left side and right side forward wing sections are in the first relative positions, and having a second cumulative area when the left side and right side forward wing sections are in the second relative positions, and the first cumulative area being larger than the second cumulative area.

19. The vehicle of claim 18, comprising:

the second cumulative area being at least 30% larger than the first cumulative area.

20. The vehicle of claim 13, further comprising:

the left side and right side forward wing sections and the left side and right side rearward wing sections having a first aspect ratio when the left side and right side forward wing sections are in the first relative positions, and having a second aspect ratio when the left side and right side forward wing sections are in the second relative positions, and the first aspect ratio being larger than the second aspect ratio.

21. The vehicle of claim 13, further comprising:

the left side and right side forward wing sections having a first wing span when the left side and right side forward wing sections are in the first relative positions, and having a second wing span when the left side and right side forward wing sections are in the second relative positions, and the first wing span being larger than the second wing span.

22. The vehicle of claim 18, further comprising:

the left side and right side forward wing sections having leading edges that are positioned at a first sweep angle in the first relative positions of the left side and right side forward wing sections, and being positioned at a second sweep angle in the second relative positions of the left side and right side forward wing sections, and the first sweep angle being smaller than the second sweep angle.

23. An aerodynamic vehicle comprising:

a forward wing having a leading edge defining a forward end of the vehicle;

a rearward wing having a trailing edge defining a rearward end of the vehicle;

the forward wing being connected to the rearward wing for relative movement with respect to the rearward wing such that an opening is formed between the forward wing and the rearward wing with no other portion of the aircraft existing in the opening;

the forward wing connected to the rearward wing for relative movement of the forward wing and the rearward wing between a first position and a second position to define the opening; and the opening has a shape that chances on movement of the forward and rearward wings between the first and second relative positions.

24. The vehicle of claim 23, further comprising:

the forward and rearward wings having a first cumulative area in the first position and the forward and rearward wings having a second cumulative area in the second position, and the first cumulative area being larger than the second cumulative area.

25. The vehicle of claim 24, further comprising:

the first cumulative area being at least 30% larger than the second cumulative area.

26. The vehicle of claim 23, further comprising:

the forward and rearward wings being coplanar.

27. The vehicle of claim 23, further comprising:

the forward wing and rearward wing extending completely around the opening.

28. The vehicle of claim 23, further comprising:

the left side and right side forward wing sections and the left side and right side rearward wing sections having a first aspect ratio when the left side and right side forward wing sections are in the first relative positions, and having a second aspect ratio when the left side and right side forward wing sections are in the second relative positions, and the first aspect ratio being larger than the second aspect ratio.

29. The vehicle of claim 23, further comprising:

the left side and right side forward wing sections having a first wing span when the left side and right side forward wing sections are in the first relative positions, and having a second wing span when the left side and right side forward wing sections are in the second relative positions, and the first wing span being larger than the second wing span.

30. The vehicle of claim 24, further comprising:

the left side and right side forward wing sections having leading edges that are positioned at a first sweep angle in the first relative positions of the left side and right side forward wing sections, and being positioned at a second sweep angle in the second relative positions of the left side and right side forward wing sections, and the first sweep angle being smaller than the second sweep angle.

* * * * *